(12) United States Patent
Kubota et al.

(10) Patent No.: US 9,163,999 B2
(45) Date of Patent: Oct. 20, 2015

(54) TEMPERATURE SENSOR, FIXING DEVICE, AND IMAGE FORMING APPARATUS

(71) Applicant: FUJI XEROX CO., LTD., Tokyo (JP)

(72) Inventors: Yuki Kubota, Kanagawa (JP); Yasutaka Goto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/182,594

(22) Filed: Feb. 18, 2014

(65) Prior Publication Data

US 2015/0063413 A1 Mar. 5, 2015

(30) Foreign Application Priority Data

Aug. 30, 2013 (JP) .................................. 2013-179921

(51) Int. Cl.
| | | |
|---|---|---|
| G03G 15/20 | (2006.01) | |
| G01J 5/58 | (2006.01) | |
| G01J 5/10 | (2006.01) | |

(52) U.S. Cl.
CPC .............. *G01J 5/58* (2013.01); *G03G 15/2039* (2013.01); *G03G 15/2053* (2013.01); *G03G 15/2078* (2013.01); *G01J 2005/103* (2013.01)

(58) Field of Classification Search
CPC .......... G03G 15/2039; G03G 15/2003; G03G 15/2007; G03G 15/2017; G03G 15/2053; G03G 15/2078; G01J 2005/10; G01J 2005/103; G01J 5/0022; G01J 2005/065

USPC ................... 399/69, 330, 335, 336; 219/216; 374/121

See application file for complete search history.

(56) References Cited

U.S. PATENT DOCUMENTS

| | | | |
|---|---|---|---|
| 8,814,426 B2 * | 8/2014 | Nakamura et al. ............ 374/121 |
| 2003/0123517 A1 * | 7/2003 | Nojiri ........................... 374/120 |
| 2014/0010262 A1 * | 1/2014 | Nakamura et al. ............ 374/121 |
| 2014/0061468 A1 * | 3/2014 | Nakamura et al. ......... 250/338.1 |
| 2014/0374596 A1 * | 12/2014 | Tari et al. .................... 250/338.1 |
| 2015/0043614 A1 * | 2/2015 | Tari et al. ...................... 374/130 |

FOREIGN PATENT DOCUMENTS

| | | | |
|---|---|---|---|
| JP | 2011013213 A | * | 1/2011 |
| JP | 2011149920 A | * | 8/2011 |
| JP | A-2012-68115 | | 4/2012 |
| JP | 2012225717 A | * | 11/2012 |
| JP | 2012226022 A | * | 11/2012 |

* cited by examiner

*Primary Examiner* — Robert Beatty
(74) *Attorney, Agent, or Firm* — Oliff PLC (57) ABSTRACT

A temperature sensor includes a front surface; a back surface; a first temperature-sensitive element and a second temperature-sensitive element disposed side by side between the front surface and the back surface; an infrared-ray absorber; and a heat-transfer inhibitor. When the temperature sensor is exposed to infrared rays that have propagated from both of a front-surface side and a back-surface side of the temperature sensor, the infrared absorber heats up by absorbing the infrared rays and transfers heat to the first temperature-sensitive element and the heat-transfer inhibiter inhibits heat transfer to the second temperature-sensitive element caused by the infrared rays.

9 Claims, 8 Drawing Sheets

TEMPERATURE SENSOR, FIXING DEVICE, AND IMAGE FORMING APPARATUS

CROSS-REFERENCE TO RELATED APPLICATIONS

This application is based on and claims priority under 35 USC 119 from Japanese Patent Application No. 2013-179921 filed Aug. 30, 2013.

BACKGROUND

Technical Field

The present invention relates to image sensors, fixing devices, and image forming apparatuses.

SUMMARY

According to an aspect of the invention, a temperature sensor includes a front surface; a back surface; a first temperature-sensitive element and a second temperature-sensitive element disposed side by side between the front surface and the back surface; an infrared-ray absorber; and a heat-transfer inhibitor. When the temperature sensor is exposed to infrared rays that have propagated from both of a front-surface side and a back-surface side of the temperature sensor, the infrared absorber heats up by absorbing the infrared rays and transfers heat to the first temperature-sensitive element and the heat-transfer inhibiter inhibits heat transfer to the second temperature-sensitive element caused by the infrared rays.

BRIEF DESCRIPTION OF THE DRAWINGS

Exemplary embodiments of the present invention will be described in detail based on the following figures, wherein.

DETAILED DESCRIPTION

Exemplary embodiments of the invention will be described below.

Figure 1:
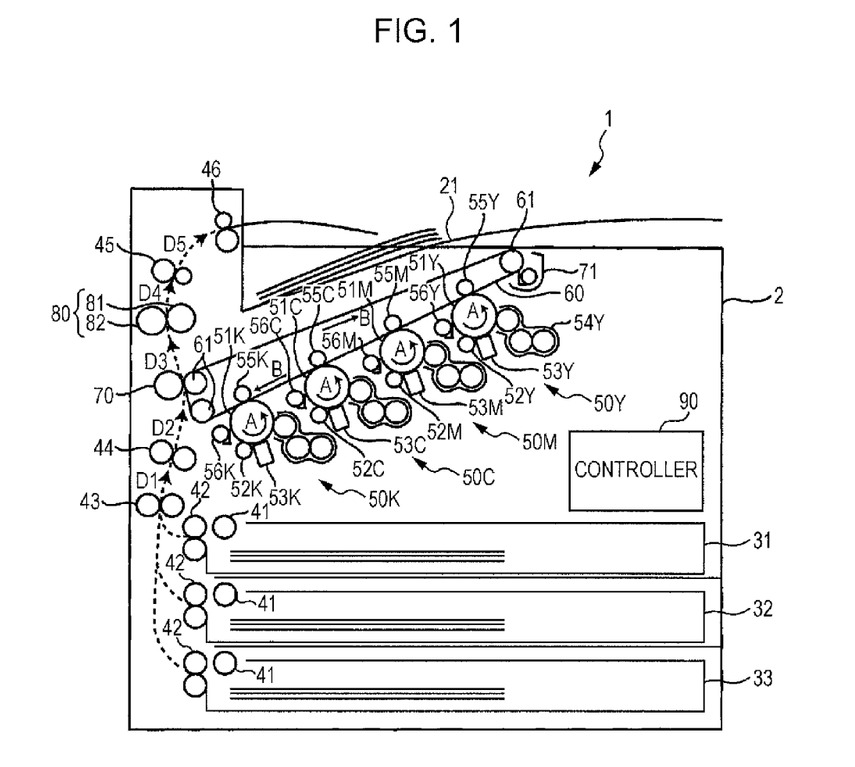
FIG. 1 schematically illustrates a configuration of a printer, which is an exemplary embodiment of an image forming apparatus in the invention.

FIG. 1 schematically illustrates a configuration of a printer 1, which is an image forming apparatus according to an exemplary embodiment of the invention.

The printer 1 includes a housing 2 and three feed trays 31, 32, and 33 at a lower portion of the housing 2. Each of the feed trays 31, 32, and 33 contains stacked sheets for printing. These feed trays 31, 32, and 33 are retractable from the housing 2 for sheet replenishment. The feed trays 31, 32, and 33 are capable of holding different types of sheets.

The printer 1 includes pick-up rollers 41 corresponding to the feed trays 31, 32, and 33. A sheet is picked up by one of the pick-up rollers 41 corresponding to a specified one of the feed trays 31, 32, and 33. When multiple sheets are picked up in a stacked manner, the sheets are reliably separated from one another by the separation rollers 42. The picked-up sheet is transported by transportation rollers 43 along the transport path indicated by a dotted line in FIG. 1 in the direction of arrow D1 and arrives at registration rollers 44. Sheet transportation beyond the registration rollers 44 will be described below.

The printer 1 includes four image forming engines 50Y, 50M, 50C, and 50K. These four image forming engines 50Y, 50M, 50C, and 50K respectively form toner images with yellow (Y), magenta (M), cyan (C), and black (K) toners. When the color distinction is not needed in the following description, the letters Y, M, C, and K representing the colors are omitted and symbols only including reference numerals are used.

Each image forming engine 50 includes a photoconductor 51, which rotates in the direction of arrow A and has a front surface on which an electrostatic latent image is formed by electrostatic potential distribution. Each image forming engine 50 also includes a charging device 52, an exposure device 53, a developing device 54, a first transfer device 55, and a cleaner 56, which are disposed around the photoconductor 51. Here, the first transfer device 55 is disposed on the inner side of an intermediate transfer belt 60 so as to sandwich the intermediate transfer belt 60 together with the photoconductor 51.

The intermediate transfer belt 60 is an endless belt that is wound around multiple rollers 61 and rotates in the direction of arrows B. A second transfer device 70 and a cleaner 71 are disposed around the intermediate transfer belt 60.

Components disposed around each photoconductor 51 perform the following operations on the corresponding photoconductor 51.

Each charging device 52 uniformly charges the surface of the photoconductor 51.

Each exposure device 53 emits exposure light modulated in accordance with image information input through a computer or other devices, not illustrated, to form an electrostatic latent image on the photoconductor 51.

Each developing device 54 contains toner of a color corresponding to the image forming engine 50. The developing device 54 develops the electrostatic latent image on the photoconductor 51 with the toner to form a toner image on the photoconductor 51.

Each first transfer device 55 transfers the toner image on the photoconductor 51 onto the intermediate transfer belt 60 so that four image forming engines 50 sequentially stack the toner images one on top of the other.

Each cleaner 56 cleans the surface of the photoconductor 51 by restoring toner remaining on the photoconductor 51 after the transfer.

A sheet that has been transported to the registration rollers 44 is forwarded in the direction of arrow D2 so that the sheet arrives at the second transfer device 70 at the time when the toner images that have been transferred onto the intermediate transfer belt 60 arrive at the second transfer device 70. The toner images on the intermediate transfer belt 60 are transferred to the sheet by the operation of the second transfer device 70.

The surface of the intermediate transfer belt 60 subjected to the transfer is cleaned by the cleaner 71.

The sheet onto which the toner image has been transferred by the operation of the second transfer device 70 is transported in the direction of arrow D3 to the fixing unit 80 while holding the unfixed toner image. The fixing unit 80 corresponds to a fixing unit in the invention and is a fixing device according to an embodiment of the present invention.

The fixing unit 80 includes a heating roller 81 and a pressing roller 82. The sheet passes through a portion between the heating roller 81 and the pressing roller 82. While passing therethrough, the toner image on the sheet is fixed to the sheet with the heat and the pressure. The sheet subjected to the fixing operation of the fixing unit 80 is further transported in the direction of arrow D4, then in the direction of arrow D5 by the transportation roller 45, and finally ejected by ejection rollers 46 onto an ejection tray 21 on the top surface of the housing 2.

The printer 1 also includes a controller 90. Besides the above-described operations of the printer 1, the controller 90 controls the temperature of the heating roller 81 of the fixing unit 80, reception of image information transmitted from an external computer or other devices, not illustrated, and other operations.

Figure 2:
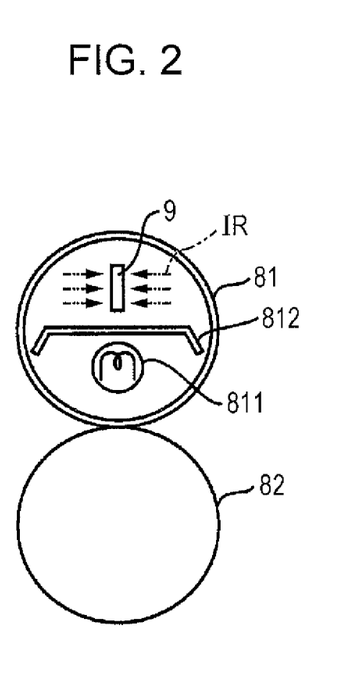
FIG. 2 schematically illustrates an internal structure of fixing rollers of a fixing unit.

FIG. 2 schematically illustrates the internal structure of the heating roller 81 of the fixing unit 80.

The heating roller 81 is hollow and contains a lamp 811, serving as a heater, and a reflection board 812 that reflects heat radiated by the lamp 811 toward the pressing roller 82. A temperature sensor 9 that measures the temperature of the heating roller 81 is disposed on the back side of the reflection board 812 of the heating roller 81 while being separated from the lamp 811 by the reflection board 812. As illustrated in FIG. 2, the temperature sensor 9 has a board shape as a whole. The temperature sensor 9 measures the temperature by capturing the heat caused by infrared rays IR propagating from its front-surface side and back-surface side. The temperature values measured by the temperature sensor 9 are input into the controller 90 illustrated in FIG. 1. The controller 90 controls power supply to the lamp 811 serving as a heater on the basis of the temperature values measured by the temperature sensor 9 so as to keep the heating roller 81 at a predetermined temperature.

Figure 3:
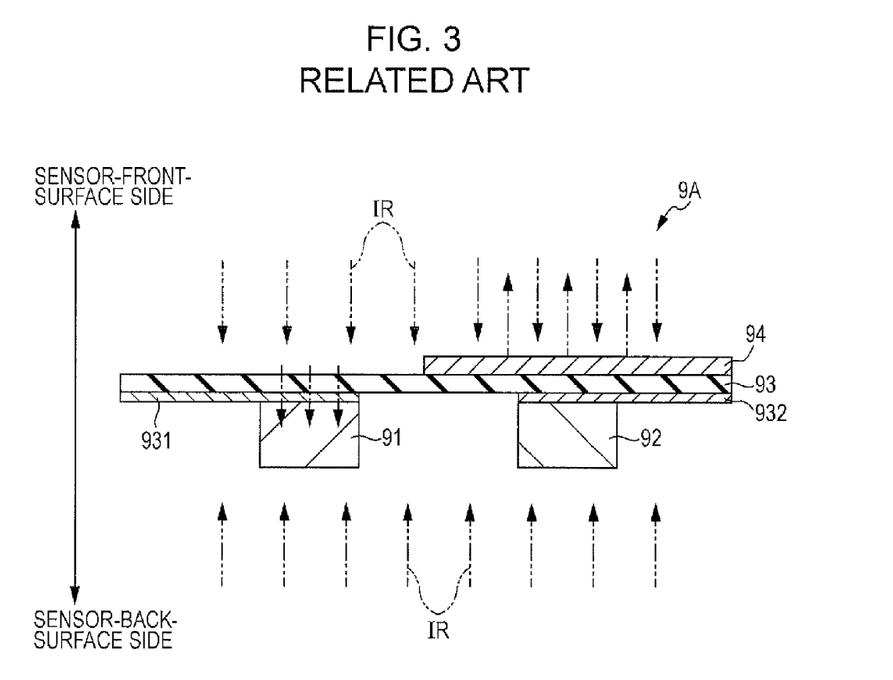
FIG. 3 schematically illustrates a temperature sensor according to a comparative example in a cross section.

FIG. 3 schematically illustrates a temperature sensor 9A according to a comparative example in a cross section.

In the temperature sensor 9A illustrated in FIG. 3, a detection thermistor 91 and a compensation thermistor 92 are disposed side by side on an insulating film 93 between the sensor front surface and the sensor back surface and respectively connected to wiring films 931 and 932 on the insulating film 93. The insulating film 93 absorbs infrared rays and increases its temperature in accordance with the light amount of the infrared rays.

An infrared-ray reflection film 94 is disposed on the insulating film 93 on the opposite side to the compensation thermistor 92.

In this structure, in a region of the insulating film 93 facing the detection thermistor 91, infrared rays IR that have propagated from the front-surface side of the sensor (upper side in FIG. 3) are absorbed by the insulating film 93 and the heat of the insulating film 93 is transferred to the detection thermistor 91. On the other hand, in a region of the insulating film 93 facing the compensation thermistor 92, infrared rays IR that have propagated from the front-surface side of the sensor are reflected by the infrared-ray reflection film 94 and fail to reach the insulating film 93. Thus, the insulating film 93 is prevented from generating heat.

Consequently, a temperature difference occurs between the detection thermistor 91 and the compensation thermistor 92. The temperature sensor 9A is thus capable of measuring the temperature of a measurement object (for example, the heating roller 81 illustrated in FIG. 2) emitting infrared rays IR while compensating the temperature of the place at which the temperature sensor 9A is disposed. Here, in the temperature sensor 9A according to the comparative example illustrated in FIG. 3, the detection thermistor 91 and the compensation thermistor 92 are similarly exposed to infrared rays IR that propagated from the back-surface side of the sensor and thus subject to the effect of the infrared rays IR. Specifically, when the temperature sensor 9A is installed in such an environment that infrared rays IR propagated from both sides of the temperature sensor 9A as in the case illustrated in FIG. 2, a portion of the insulating film 93 around the detection thermistor 91 and a portion of the insulating film 93 around the compensation thermistor 92 are both heated by the propagated infrared rays IR. This may prevent the temperature difference between the detection thermistor 91 and the compensation thermistor 92 from being sufficient for measuring, although a larger temperature difference is preferable for highly accurate measurement of a measurement object.

Figure 4:
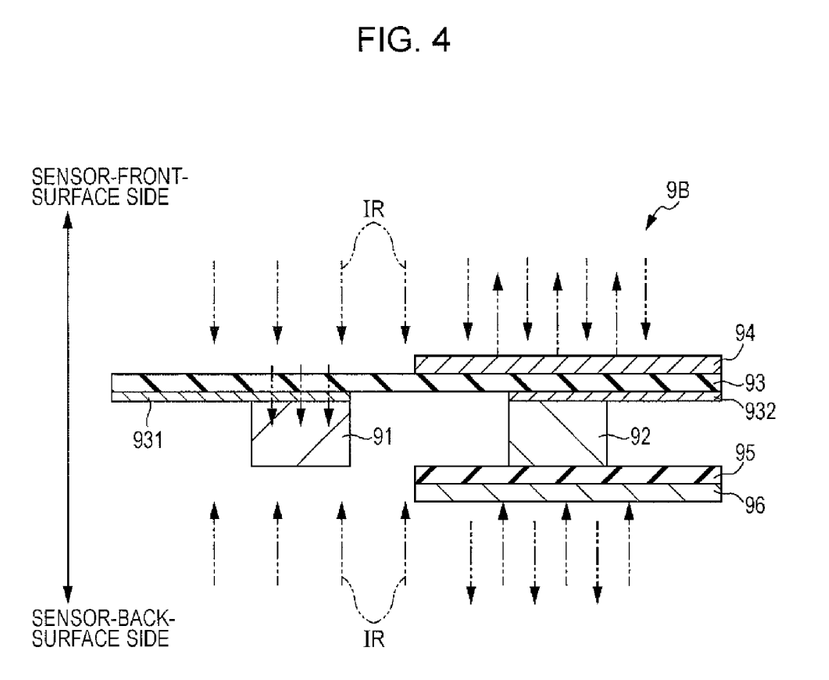
FIG. 4 schematically illustrates a temperature sensor according to a first exemplary embodiment of the invention in a cross section.

FIG. 4 schematically illustrates a temperature sensor 9B according to a first exemplary embodiment of the invention in a cross section.

The temperature sensor 9B illustrated in FIG. 4 may be used as an example of the temperature sensor 9 illustrated in FIG. 2.

Herein, components of the temperature sensor 9B corresponding to the components of the temperature sensor 9A according to the comparative example illustrated in FIG. 3 are denoted by the same symbols as those used in FIG. 3 and not described.

In the temperature sensor 9B illustrated in FIG. 4, an insulating film 95 is additionally provided so as to sandwich the compensation thermistor 92 together with the insulating film 93. An infrared-ray reflection film 96, which is similar to the infrared-ray reflection film 94, is additionally disposed on the side of the insulating film 95 facing the sensor back surface. Thus, the infrared-ray reflection films 94 and 96 reflect infrared rays IR that propagate from the front-surface side and the back-surface side of the sensor and minimize an increase in temperature of the compensation thermistor 92 caused by the infrared rays IR. Similarly to the temperature sensor 9A illustrated in FIG. 3, the detection thermistor 91 is subject to the effect of infrared rays IR that propagate from both of the front-surface side and the back-surface side of the sensor. The temperature sensor 9B illustrated in FIG. 4 is thus capable of more accurately measuring the temperature than the temperature sensor 9A according to the comparative example illustrated in FIG. 3 in accordance with an increase in temperature difference between the detection thermistor 91 and the compensation thermistor 92 if the sensors 9A and 9B measure the temperature of the same object.

In the case of the temperature sensor 9B illustrated in FIG. 4, the detection thermistor 91 and the compensation thermistor 92 respectively correspond to examples of a first temperature-sensitive element and a second temperature-sensitive element in the invention. In addition, the insulating film 93 corresponds to an example of an infrared-ray absorber or a substrate in the invention. The infrared-ray absorber has an infrared-ray emissivity of 0.7 or higher provided that the wavelength of the infrared rays is 8 to 14 µm. The thickness of the insulating film 93 is 50 μm. When the insulating film 93 has a thickness not exceeding 100 μm, the temperature of the insulating film 93 more easily increases in response to the absorption of infrared rays than in the case where the insulating film 93 has a thickness exceeding 100 μm. Each of the infrared-ray reflection films 94 and 96 corresponds to an example of an infrared-ray reflector in the invention. The infrared-ray reflector has an infrared-ray emissivity of 0.3 or lower provided that the wavelength of the infrared rays is 8 to 14 μm. A combination of the infrared-ray reflection films 94 and 96 corresponds to an example of a heat-transfer inhibitor in the invention.

Figure 5:
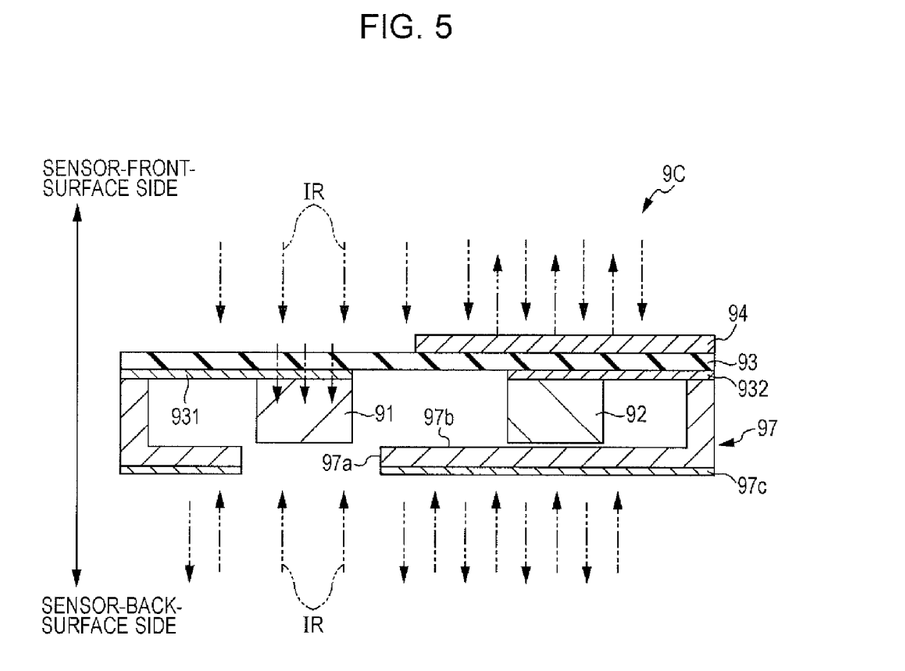
FIG. 5 schematically illustrates a temperature sensor according to a second exemplary embodiment of the invention in a cross section.

FIG. 5 schematically illustrates a temperature sensor 9C according to a second exemplary embodiment of the invention in a cross section.

Also in this exemplary embodiment, only the points different from those of the comparative example illustrated in FIG. 3 will be described.

The temperature sensor 9C illustrated in FIG. 5 includes a cover member 97 on the sensor-back-surface side. The cover member 97 is an aluminum board having a thickness of 1.0 mm. A surface of the cover member 97 facing the compensation thermistor 92 is an unpolished aluminum surface 97b and has an infrared-ray emissivity of 0.2, while a surface of the cover member 97 not facing the compensation thermistor 92 (the surface from which the infrared rays IR from the sensor back surface enter) is covered with a black anodized aluminum film 97c and thus has an infrared-ray emissivity of 0.9. The cover member 97 covers the back surface of the compensation thermistor 92 while the detection thermistor 91 is exposed through an opening 97a formed at such a position as to face the back surface of the detection thermistor 91 to allow infrared rays IR to pass therethrough.

Similarly to the temperature sensor 9B according to the first exemplary embodiment illustrated in FIG. 4, in the temperature sensor 9C according to the second exemplary embodiment, infrared rays IR that have propagated from the front-surface side of the sensor are reflected by the infrared-ray reflection film 94 without reaching the compensation thermistor 92. Infrared rays IR that have propagated from the back-surface side of the sensor are absorbed by the anodized aluminum film 97c. Here, since the emissivity of the surface of the cover member 97 facing the compensation thermistor 92 is 0.3 or lower, emission of the infrared rays from the cover member 97 to the compensation thermistor 92 is minimized, thereby minimizing an increase in temperature of the compensation thermistor 92. Moreover, since the cover member 97 has a thickness of 1.0 mm, the cover member 97 is prevented from increasing its temperature due to its heat capacity. This heat capacity also minimizes emission of infrared rays from the cover member 97 to the compensation thermistor 92.

On the other hand, the detection thermistor 91 is subject to the effect of the infrared rays IR that have propagated from both of the front-surface side and the back-surface side of the sensor. Thus, similarly to the temperature sensor 9B illustrated in FIG. 4, the temperature sensor 9C illustrated in FIG. 5 is capable of more accurately measuring the temperature in accordance with an increase in temperature difference between the detection thermistor 91 and the compensation thermistor 92 than the temperature sensor 9A according to the comparative example illustrated in FIG. 3.

In the temperature sensor 9C illustrated in FIG. 5, the infrared-ray reflection film 94 disposed adjacent to the sensor front surface corresponds to an example of a first infrared-ray reflector in the invention and a cover member 97 having an unpolished aluminum surface 97b corresponds to an example of a second infrared-ray reflector in the invention. The anodized aluminum film 97c corresponds to an example of an infrared-ray shield. The infrared-ray shield has an infrared-ray emissivity exceeding 0.3 provided that the wavelength of infrared rays is 8 to 14 μm.

A combination of the infrared-ray reflection film 94, the cover member 97, and the anodized aluminum film 97c corresponds to an example of a heat-transfer inhibitor in the invention.

Figure 6:
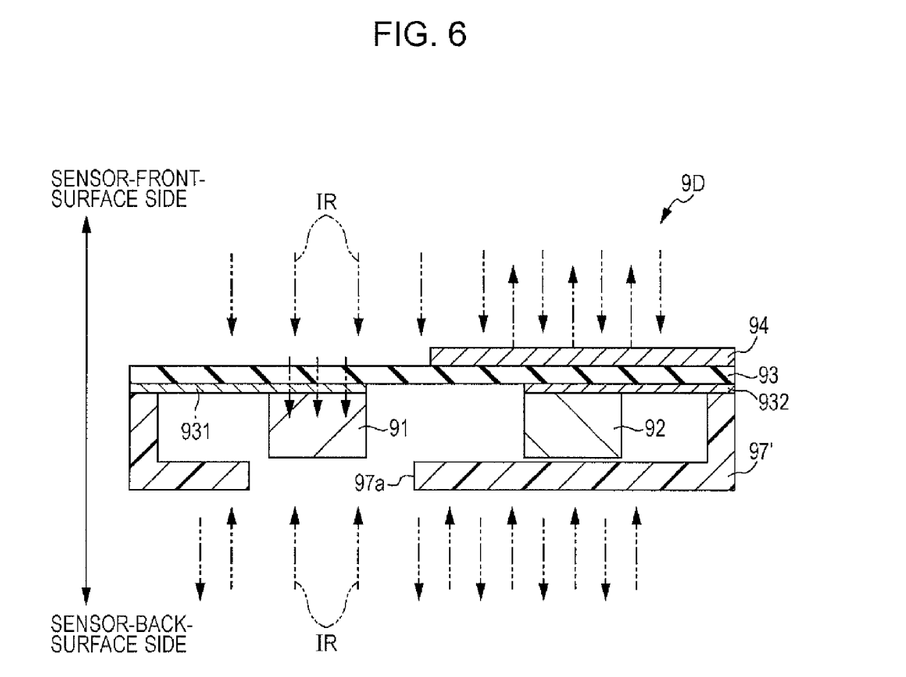
FIG. 6 schematically illustrates a temperature sensor according to a third exemplary embodiment of the invention in a cross section.

FIG. 6 schematically illustrates a temperature sensor 9D according to a third exemplary embodiment of the invention in a cross section. In the description of the temperature sensor 9D according to the third exemplary embodiment, components corresponding to the components of the temperature sensor 9C illustrated in FIG. 5 are denoted by the same symbols as those used in FIG. 5 and only the different points will be described.

Similarly to the temperature sensor 9C illustrated in FIG. 5, the temperature sensor 9D illustrated in FIG. 6 includes a cover member 97' on the sensor-back-surface side. Here, unlike the cover member 97 of the temperature sensor 9C illustrated in FIG. 5, the cover member 97' is a board made of polyphenylene sulfide resin and having a thickness of substantially 0.5 mm or higher and an emissivity of 0.9. In this exemplary embodiment, the cover member 97' is used as an infrared-ray shield. The cover member 97' has a thickness of substantially 0.5 mm or higher and an increase in temperature of the cover member 97' is minimized, thereby minimizing the emission of infrared rays from the cover member 97' to the compensation thermistor 92.

Components of the temperature sensor 9D illustrated in FIG. 6 other than the cover member 97' are the same as the components of the temperature sensor 9C illustrated in FIG. 5 and thus are not redundantly described.

Figure 7:
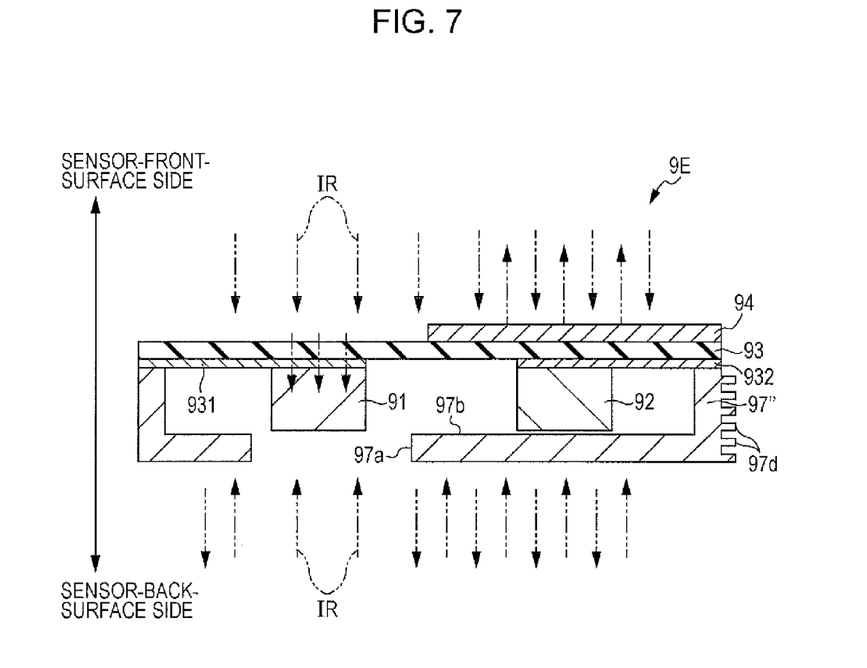
FIG. 7 schematically illustrates a temperature sensor according to a fourth exemplary embodiment of the invention in a cross section.

FIG. 7 schematically illustrates a temperature sensor 9E according to a fourth exemplary embodiment of the invention in a cross section.

Similarly to the description of the temperature sensor 9D illustrated in FIG. 6, in the description of the temperature sensor 9E according to the fourth exemplary embodiment, components corresponding to the components of the temperature sensor 9C illustrated in FIG. 5 are denoted by the same symbols as those used in FIG. 5 and only the different points will be described.

Similarly to the temperature sensor 9C illustrated in FIG. 5, the temperature sensor 9E illustrated in FIG. 7 includes a cover member 97" on the sensor-back-surface side. The cover member 97" is made of aluminum and has a thickness of 1.0 mm. Unlike the cover member 97 of the temperature sensor 9C illustrated in FIG. 5, the cover member 97" has radiating fins 97d instead of having a black anodized aluminum film 97c on the surface not facing the compensation thermistor 92 (the surface from which infrared rays IR from the sensor back surface enter). The radiating fins 97d are an example of a heat-radiating portion in the invention. In this exemplary embodiment, the provision of the radiating fins 97d minimizes an increase in temperature of the cover member 97".

Alternatively, as in the case of the cover member 97 of the temperature sensor 9C illustrated in FIG. 5, the cover member 97" may also have a black anodized aluminum film 97c on the side not facing the compensation thermistor 92 (the surface from which the infrared rays IR from the sensor back surface enter) besides the radiating fins 97d.

Components of the temperature sensor 9E illustrated in FIG. 7 other than the cover member 97" are the same as the components of the temperature sensor 9C illustrated in FIG. 5 and thus are not redundantly described.

Figure 8:
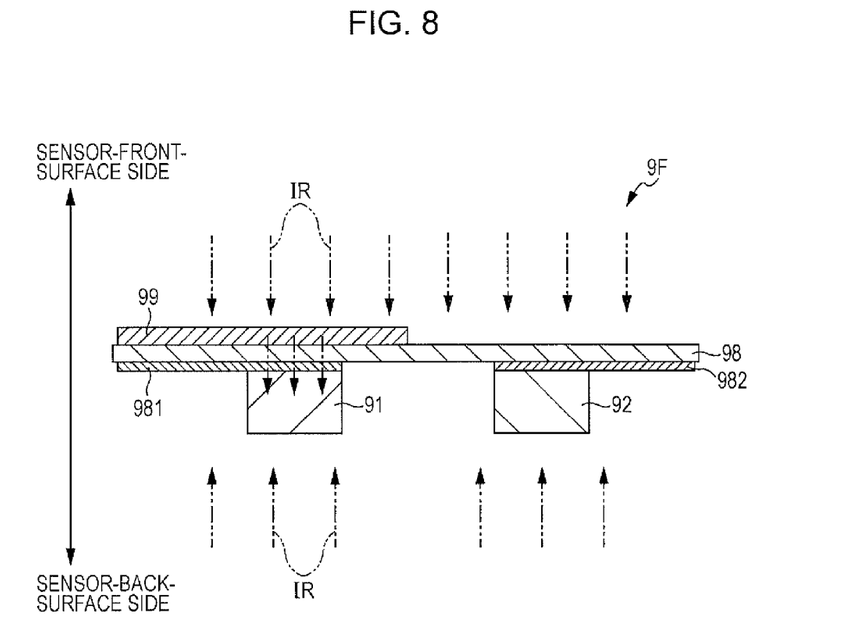
FIG. 8 schematically illustrates a temperature sensor according to a fifth exemplary embodiment of the invention in a cross section.

FIG. 8 schematically illustrates a temperature sensor 9F according to a fifth exemplary embodiment of the present invention in a cross section.

In the temperature sensor 9F illustrated in FIG. 8, the detection thermistor 91 and the compensation thermistor 92 are disposed side by side on an infrared-ray translucent film 98 while being respectively connected to wiring films 981 and 982 formed on the infrared-ray translucent film 98. The infrared-ray translucent film 98 negligibly absorbs propagated infrared rays. The infrared-ray translucent film 98 allows the infrared rays to pass therethrough. An infrared-ray absorbing film 99 is disposed on the infrared-ray translucent film 98 on the opposite side to the detection thermistor 91. The infrared-ray absorbing film 99 absorbs propagated infrared rays and converts the infrared rays into heat.

In the temperature sensor 9F, infrared rays that enter a region of the infrared-ray translucent film 98 corresponding to the compensation thermistor 92 from both of the sensor front surface and the sensor back surface merely pass through the region of the infrared-ray translucent film 98 and are less likely to be converted into the heat energy. On the other hand, infrared rays that enter a region of the infrared-ray translucent film 98 corresponding to the detection thermistor 91 from both of the sensor front surface and the sensor back surface are absorbed by the infrared-ray absorbing film 99 and converted into the heat energy. The heat energy converted by the infrared-ray absorbing film 99 is transferred to the detection thermistor 91 via the infrared-ray translucent film 98. Thus, similarly to the temperature sensors 9B to 9E illustrated in FIGS. 4 to 7, the temperature sensor 9F illustrated in FIG. 8 is capable of more accurately measuring the temperature than the temperature sensor 9A according to the comparative example illustrated in FIG. 3 in accordance with an increase in temperature difference between the detection thermistor 91 and the compensation thermistor 92.

In the temperature sensor 9F illustrated in FIG. 8, the infrared-ray translucent film 98 corresponds to an example of an infrared-ray translucent substrate in the invention. In addition, the infrared-ray absorbing film 99 corresponds to an example of an infrared-ray absorbing film in the invention.

In the temperature sensor 9F illustrated in FIG. 8, the infrared-ray absorbing film 99 may be disposed on the side of the infrared-ray translucent film 98 adjacent to the detection thermistor 91 so as to be directly in contact with the detection thermistor 91.

Although the temperature sensors according to the exemplary embodiments of the invention have been exemplarily described thus far, a temperature sensor in the invention is not limited to these embodiments and may be any temperature sensor according to an aspect of the invention.

Herein, the printer illustrated in FIG. 1 is used as an example of an image forming apparatus in the invention. However, the image forming apparatus may be any apparatus having any specific structure provided that the apparatus includes an image forming unit, which forms an unfixed toner image on a sheet, and a fixing unit, which heats and presses the sheet holding the unfixed toner image by nipping the sheet to fix the toner image onto the sheet.

Moreover, although the fixing unit illustrated in FIGS. 1 and 2 is used as an example of the fixing device in the invention, the fixing device may be any apparatus having any specific structure provided that the device includes a temperature sensor in the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A temperature sensor, comprising:
   a front surface;
   a back surface;
   a first temperature-sensitive element and a second temperature-sensitive element disposed side by side between the front surface and the back surface;
   an infrared-ray absorber; and
   a heat-transfer inhibitor,
   wherein, when the temperature sensor is exposed to infrared rays that have propagated from both of a front-surface side and a back-surface side, the infrared absorber heats up by absorbing the infrared rays and transfers heat to the first temperature-sensitive element and the heat-transfer inhibitor inhibits heat transfer to the second temperature-sensitive element caused by the infrared rays,
   wherein the infrared-ray absorber is a substrate on which the first temperature-sensitive element and the second temperature-sensitive element are mounted, and
   wherein the heat-transfer inhibitor includes infrared-ray reflectors disposed at a front-surface side and a back-surface side of the second temperature-sensitive element.

2. A fixing device, comprising:
   a fixing unit heats and presses a sheet holding an unfixed toner image by nipping the sheet to fix the toner image onto the sheet, and
   the temperature sensor according to claim 1.

3. An image forming apparatus, comprising:
   an image forming unit that forms an unfixed toner image on a sheet; and
   a fixing unit that heats and presses the sheet holding the unfixed toner image by nipping the sheet to fix the toner image onto the sheet,
   the temperature sensor according to claim 1.

4. A temperature sensor, comprising:
   a front surface;
   a back surface;
   a first temperature-sensitive element and a second temperature-sensitive element disposed side by side between the front surface and the back surface;
   an infrared-ray absorber; and
   a heat-transfer inhibitor,
   wherein, when the temperature sensor is exposed to infrared rays that have propagated from both of a front-surface side and a back-surface side, the infrared absorber heats up by absorbing the infrared rays and transfers heat to the first temperature-sensitive element and the heat-transfer inhibitor inhibits heat transfer to the second temperature-sensitive element caused by the infrared rays,
   wherein the infrared-ray absorber is a substrate on which the first temperature-sensitive element and the second temperature-sensitive element are mounted, and
   wherein the heat-transfer inhibitor includes an infrared-ray reflector and an infrared-ray shield having (1) a thickness of substantially 0.5 mm or larger or (2) a heat radiating portion, the infrared-ray reflector is disposed at one of a front-surface side and a back-surface side of the second temperature-sensitive element, and the infrared-ray shield is disposed at the other side of the second temperature-sensitive element.

5. A fixing device, comprising:
a fixing unit heats and presses a sheet holding an unfixed toner image by nipping the sheet to fix the toner image onto the sheet, and
the temperature sensor according to claim 4.

6. An image forming apparatus, comprising:
an image forming unit that forms an unfixed toner image on a sheet; and
a fixing unit that heats and presses the sheet holding the unfixed toner image by nipping the sheet to fix the toner image onto the sheet,
the temperature sensor according to claim 4.

7. A temperature sensor, comprising:
a front surface;
a back surface;
a first temperature-sensitive element and a second temperature-sensitive element disposed side by side between the front surface and the back surface;
an infrared-ray absorber; and
a heat-transfer inhibitor,
wherein, when the temperature sensor is exposed to infrared rays that have propagated from both of a front-surface side and a back-surface side, the infrared absorber heats up by absorbing the infrared rays and transfers heat to the first temperature-sensitive element and the heat-transfer inhibitor inhibits heat transfer to the second temperature-sensitive element caused by the infrared rays,
wherein the infrared-ray absorber is a substrate on which the first temperature-sensitive element and the second temperature-sensitive element are mounted, and
wherein the heat-transfer inhibitor includes a first infrared-ray reflector, an infrared-ray shield, and a second infrared-ray reflector, the first infrared-ray reflector is disposed at one of a front-surface side and a back-surface side of the second temperature-sensitive element, the infrared-ray shield is disposed at the other side of the second temperature-sensitive element, and the second infrared-ray reflector is disposed at a second-temperature-sensitive-element side of the infrared-ray shield.

8. A fixing device, comprising:
a fixing unit heats and presses a sheet holding an unfixed toner image by nipping the sheet to fix the toner image onto the sheet, and
the temperature sensor according to claim 7.

9. An image forming apparatus, comprising:
an image forming unit that forms an unfixed toner image on a sheet; and
a fixing unit that heats and presses the sheet holding the unfixed toner image by nipping the sheet to fix the toner image onto the sheet,
the temperature sensor according to claim 7.

* * * * *